United States Patent [19]

Schneider

[11] Patent Number: 5,848,764
[45] Date of Patent: Dec. 15, 1998

[54] BODY FIXED TERMINAL GUIDANCE SYSTEM FOR A MISSILE

[75] Inventor: Arthur J. Schneider, Tucson, Ariz.

[73] Assignee: Raytheon Company, Los Angeles, Calif.

[21] Appl. No.: 876,080

[22] Filed: Jun. 13, 1997

[51] Int. Cl.$^6$ ........................................ F41G 7/00
[52] U.S. Cl. ............................................ 244/3.15
[58] Field of Search .................... 244/3.15, 3.16, 244/3.19

[56] References Cited

U.S. PATENT DOCUMENTS

| | | | |
|---|---|---|---|
| 3,964,695 | 6/1976 | Harris | 244/3.16 |
| 4,383,663 | 5/1983 | Nichols | 244/3.16 |
| 4,898,341 | 2/1990 | Terzian | 244/3.16 |
| 5,211,356 | 5/1993 | McWilliams et al. | 244/3.15 |
| 5,303,878 | 4/1994 | McWilliams et al. | 244/3.15 |
| 5,341,142 | 8/1994 | Reis et al. | 244/3.16 |
| 5,435,503 | 7/1995 | Johnson, Jr. et al. | 244/3.15 |

*Primary Examiner*—Charles Jordan
*Assistant Examiner*—Theresa M. Wesson
*Attorney, Agent, or Firm*—Brian C. Downs; Leonard A. Alkov; Glenn H. Lenzen, Jr.

[57] ABSTRACT

A guidance system (30) for a missile comprising a sensor (20) mounted on the missile and having a fixed line-of-sight relative thereto. The body fixed sensor (20) provides a first signal representing frames of image data. A processor (40) identifies a target in the frames of image data and provides a second signal representative of the location of the centroid thereof. A conventional tracker (36) follows the target and provides a third signal representative of an aim point of the missile. A controller (44) then changes the velocity vector of the missile in response to the second and third signals. In a specific embodiment, the body fixed sensor (20) provides first and second frames of image data. The system (32, 34) subtracts the first and second frames of image data and ascertains a growth center of the target. The processor (40) compares the image growth center to the aim point and provides an error signal in response thereto. The controller (44) then changes the velocity vector of the missile as necessary to maintain the error signal within a predetermined value. The processor (40) also provides an estimate of missile travel time to the target. When the travel time to target drops below a predetermined threshold, terminal guidance is effected by an inertial measurement unit (46).

8 Claims, 2 Drawing Sheets

BODY FIXED TERMINAL GUIDANCE SYSTEM FOR A MISSILE

BACKGROUND OF THE INVENTION

1. Field of the Invention

The present invention relates to missile guidance systems. More specifically, the present invention relates to systems and techniques for effecting terminal guidance for missiles with respect to high speed targets.

2. Description of the Related Art

Many missiles have onboard guidance systems which direct the missile to a moving or a stationary target. The guidance systems generally include a seeker and a sensor mounted on gimbals in or near the nose of the missile. The gimbals allow for the line of sight of the seeker to be changed along one or more angles with respect to the body of the missile to accurately track a target while the missile is in flight. When the seeker is locked onto a target, a gyroscope mounted on the gimbals measures the line-of-sight rate. The line-of-sight rate is the rate at which an angle between the target and the body of the missile changes due to the relative motion of the missile and the target. In order to hit the target, the line-of-sight rate must be reduced to zero.

Unfortunately, the conventional gimbaled seeker is costly due to the need for gyroscopes, gimbals, readouts for the gimbals, torquers and torquer servo-control circuits.

In addition, the conventional gimbaled seeker does not work well for 'shoot-down' warheads which are designed to explode in the vicinity of the target. This is due to the fact that as the missile approaches the target, one of the gimbals, typically the pitch gimbal, must nod faster and faster. Accuracy is limited by the accuracy of the gimbal angle read-outs.

Hence, a need exists in the art for an effective, low cost missile guidance system for high speed moving targets.

SUMMARY OF THE INVENTION

The need in the art is addressed by the present invention which provides a guidance system for a missile comprising a sensor mounted on the missile and having a fixed line-of-sight relative thereto. The sensor provides a first signal representing frames of image data. A processor identifies a target in the frames of image data and provides a second signal representative of the location of the centroid thereof. A conventional tracker follows the target and provides a third signal representative of an aim point of the missile. A controller then changes the velocity vector of the missile in response to the second and third signals.

In a specific embodiment, the body fixed sensor provides first and second frames of image data. The processor subtracts the first and second frames of image data and ascertains a growth center of the target. The processor compares the image growth center to the aim point and provides an error signal in response thereto. The controller then changes the velocity vector of the missile as necessary to maintain the error signal within a predetermined value. The processor also provides an estimate of missile travel time to the target. When the travel time to target drops below a predetermined threshold, terminal guidance is effected by an inertial measurement unit.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention identifies a target and a desired aim point on the target which may be offset from the centroid. An example is a shoot down warhead where the desired aim point may be 150% of the vertical dimension of the target. At long range, the growth rate is low so that finding the growth center does not provide an accurate means of fixing the velocity vector. At these ranges, a pursuit guidance system can be used to point the missile body at the target where the velocity vector is along the missile axis in the horizontal plane and offset a known amount in the vertical plane.

At shorter ranges, the image growth rate is sufficient to define the growth rate of the target image. The growth center is the location of the relative velocity vector in the image plane, whether the target is moving or stationary. Knowing the difference between the growth center and the desired aim point provides an error signal to change the velocity vector to impact at the desired aimpoint.

As the target is approached and the velocity vector is close to the aim point, the image growth rate increases and the velocity vector will stabilize. At all times during the flight, the inertial measurement unit (IMU) of the missile measures the missile velocity with accuracies approaching 1 or 2 feet per second. If guidance of the missile is handed over to the IMU at 0.25 seconds to go, error growth may be at 0.25 to 0.5 feet. At a terminal velocity of 600 feet per second, the range to go may be 150 feet. If the frame rate of the image is 30 hertz, the distance traveled between frames may be 20 feet and the image growth 25%, enabling an accurate location of the growth center and the predicted impact point of the missile. In this example, 0.25 seconds to go is a suitable time to hand missile guidance over to the IMU for terminal guidance.

In accordance with the present teachings, guidance is accomplished without the need for moving gimbals, a rate gyro to measure the line-of-sight rate, or gimbal angle read-outs, thereby reducing the cost of the sensor system.

Figure 1:
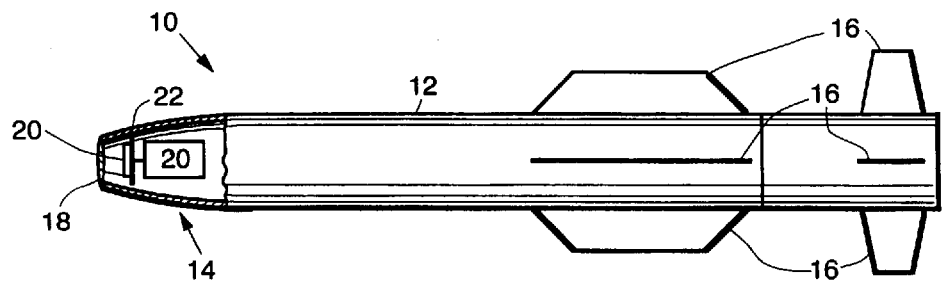
FIG. 1 is a simplified diagram partially in section of a missile incorporating a body fixed sensor in accordance with the teachings of the present invention.
Figure 2:
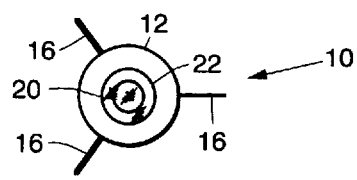
FIG. 2 is an end view of the missile depicted in FIG. 1.

FIG. 1 is a simplified diagram partially in section of a missile incorporating a body fixed sensor in accordance with the teachings of the present invention. FIG. 2 is an end view of the missile depicted in FIG. 1. As shown in FIGS. 1 and 2, the missile 10 has a central body portion 12, a nose cone 14 and a plurality of fins 16. The nose cone 14 is shown in section to reveal an image sensor 20 mounted behind a window 18. Those skilled in the art will appreciate that the sensor 20 may be an infrared (IR) sensor, a television (TV)

camera or any other sensor technology, effective to generate an image of a target, without departing from the scope of the present teachings.

The sensor 20 is rigidly mounted on a bulkhead 22 which is fixed to the frame of the missile 10. Hence, the sensor is 'body fixed' and has a fixed line-of-sight and field of view relative to the missile 10. The field of view of the body fixed sensor is selected so that most of the target is within the field of view thereof at ranges of interest so that no gimbal is required. The line of sight of the sensor is biased to account for the angle of attack of the missile. The sensor 20 is electrically connected to a missile guidance system 30 as discussed more fully below.

Figure 3:
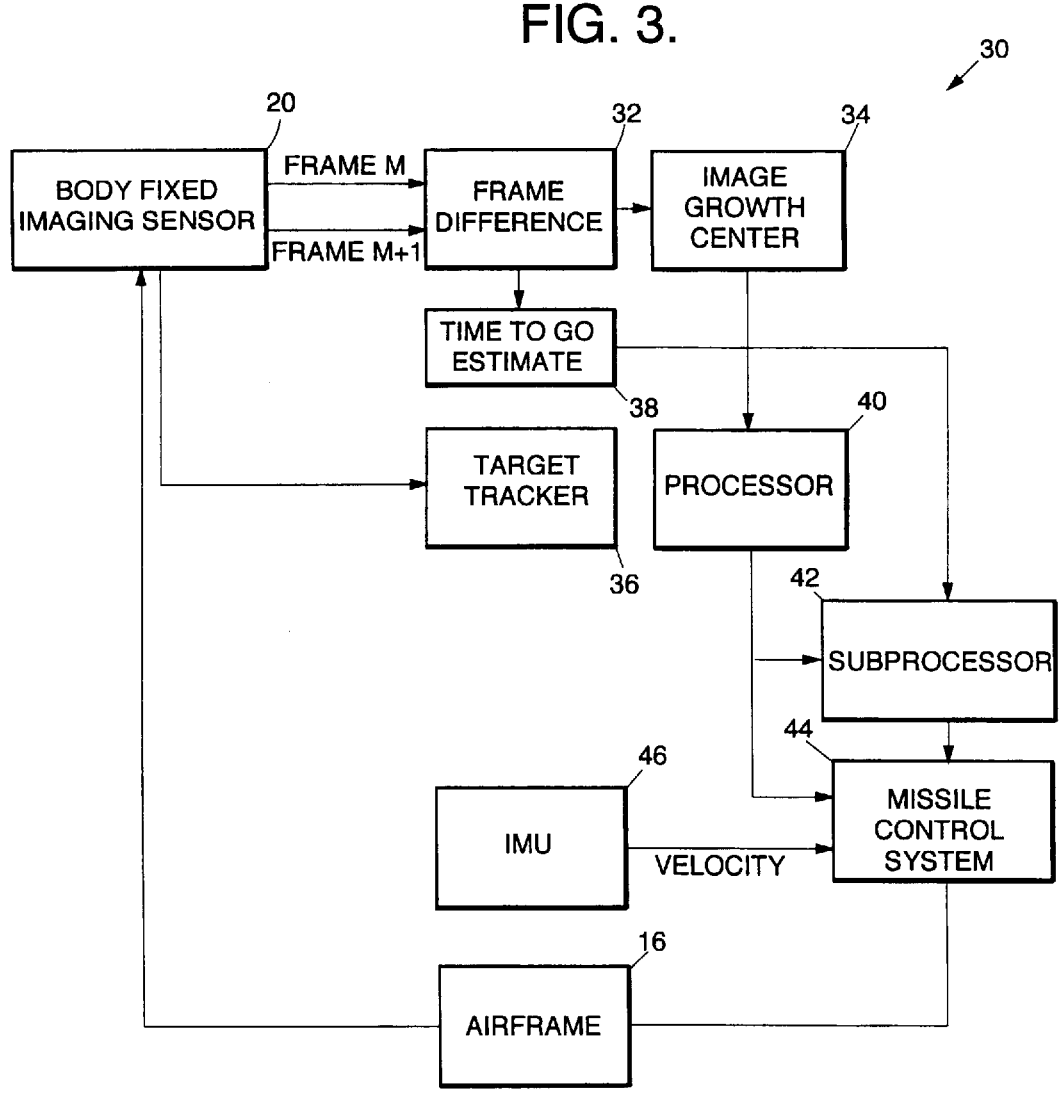
FIG. 3 is a block diagram illustrative of the missile guidance system of the present invention.

FIG. 3 is a block diagram illustrative of the missile guidance system of the present invention. As shown in FIG. 3, the system 30 includes a circuit 32 which captures successive frames of digital image data from the sensor 20 and provides a signal representative thereof. Those skilled in the art will appreciate that if digital image data is not provided by the sensor 20, an analog-to-digital converter may be used to digitize the image data prior to communication of same to the image capture circuit 32. Image capture circuits are well known in the art and may be purchased from a number of companies.

By subtracting successive frames of image data, stationary objects in the image may be removed and a moving target may be identified. When the target is identified, a centroid calculation circuit 34 determines the centroid of the target. Centroid calculation is well known in the art and may be achieved in any suitable manner.

The output of the sensor 20 is also provided to a conventional target tracker 36 which outputs an indication of the aim point of the missile relative to the target. Aim point location data and the target centroid data are provided to a processor 40 which generates an error signal representative of the difference therebetween. The error signal represents a difference between the velocity vector of the missile and the center of the target. It will be appreciated by those skilled in the art that the centroid calculation function may be performed by the processor 40.

The error signal output by the processor 40 is input to a conventional missile control system 44. Using a routine or subprocessor 42, the missile control system 44 activates the fins 16 of the missile 10 to maintain the error signal within a prescribed range. In the illustrative embodiment, the error signal is maintained as close to zero as possible.

The image capture circuit 32 generates a time-to-go estimate (shown at 38) to ascertain the travel time of the missile to the target. 'Time to go' is calculated from the frame difference by selecting a feature at an angle ($\Theta$) from the image growth center and observing the amount of growth ($\Delta\Theta$) in the time lapse between frames. 'Time to go' (T) is then:

$$T = \Theta \times \Delta t / \Delta \Theta$$

When the 'time to go' estimate (T) drops below a predetermined threshold ($T_{crit}$) the missile control system 44 responds to a conventional onboard inertial measurement unit 46.

Figure 4A:
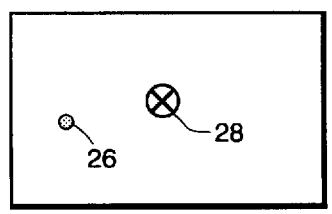
FIGS. 4a–4d depict frames of image data generated by the body fixed image sensor of the present invention.
Figure 4B:
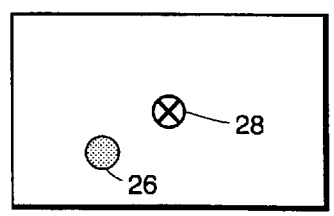

FIGS. 4a–4d depict frames of image data generated by the body fixed image sensor 20 of the present invention. As shown in FIG. 4a, at the time of launch $t_0$, the sensor 20 has a target 26 within its field of view. At time $t_1$, the target has grown in the missile sensor's field of view as shown in FIG. 4b due to the approach of the missile to the target. The growth of the image allows for the centroid calculator 34 to identify the target and the center thereof The output of the centroid calculator 34 and the output of the tracker 36 are used by the processor 40 as discussed above to provided an error signal representative of the difference between the center of the target 26 and the aim point of the missile 28. The missile control system 44 controls the guidance of the missile by adjusting the fins thereof to drive the error signal to zero. This creates an image output by the sensor 20 such as that depicted in FIG. 4c.

Figure 4C:
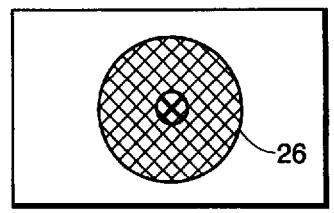
Figure 4D:
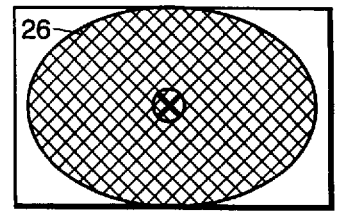

FIG. 4c shows the output of the image sensor 20 when the aim point of the missile 10 is coincident with the center of the target. As mentioned above, as the missile 10 closes on the target 26, the target 26 blooms in the sensors field of view. When the time to go estimate drops below $T_{crit}$, guidance is turned over to the onboard inertial measurement unit 46 up to the point of impact or explosion of the missile 10.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A guidance system for a missile having a velocity vector comprising:

a sensor mounted on the missile and having a fixed line-of-sight relative to the missile, said sensor providing a first signal comprising first and second frames of image data;

first means connected to said sensor for identifying a target in said frames of image data and providing a second signal representative of the location of the centroid of an image of said target, said first means including:

means for providing a difference between said first and second frames of image data and means responsive to said difference between said first and second frames of image data for ascertaining an image growth center of said target;

second means for tracking said target and providing a third signal representative of an aim point of said missile; and third means for controlling the velocity vector of said missile in response to said second and third signals, said third means including:

means for comparing the image growth center to the aim point and providing an error signal in response to said comparison and means for controlling the velocity vector of said missile to maintain said error signal within a predetermined value.

2. The invention of claim 1 wherein said predetermined value is zero.

3. A guidance system for a missile having a velocity vector comprising:

a sensor mounted on the missile and having a fixed line-of-sight relative to the missile, said sensor providing a first signal comprising first and second frames of image data;

first means connected to said sensor for identifying a target in said frames of image data and providing a second signal representative of the location of the centroid of an image of said target, said first means including:
  means for providing a difference between said first and second frames of image data and
  means responsive to said difference between said first and second frames of image data for ascertaining an image growth center of said target;
second means for tracking said target and providing a third signal representative of an aim point of said missile;
third means for controlling the velocity vector of said missile in response to said second and third signals, said third means including means for comparing the image growth center to the aim point and providing an error signal in response to said comparison and
fourth means responsive to said difference between said first and second frames of image data for providing an estimate of time to target.

4. The invention of claim 3 further including an inertial measurement unit.

5. The invention of claim 3 further including means for providing a terminal guidance signal when said time to target estimate reaches a predetermined threshold.

6. The invention of claim 5 wherein said third means responds to an inertial measurement unit on receipt of said terminal guidance signal.

7. A guidance system for a missile having a velocity vector comprising:
  a sensor mounted on the missile and having a fixed line-of-sight relative to the missile, said sensor providing a first signal representative of first and second frames of image data;
  first means connected to said sensor for identifying a target in said frames of image data and providing a second signal representative of the location of the centroid of an image of said target, said first means including means for providing a difference between said first and second frames of image data and means responsive to said difference for ascertaining an image growth center of said target;
  second means connected to said sensor for tracking said target and providing a third signal representative of an aim point of said missile;
  third means for controlling the velocity vector of said missile in response to said second and third signals, said third means including:
    means for comparing the image growth center to the aim point and providing an error signal in response to said comparison and
    means including means for controlling the velocity vector of said missile to maintain said error signal within a predetermined value;
  fourth means for providing an estimate of missile travel time to said target;
  fifth means for providing a terminal guidance signal when said time to target estimate reaches a predetermined threshold; and
  sixth means for providing terminal guidance for said missile on receipt of said terminal guidance signal.

8. A method for guiding a missile having a sensor mounted thereon, said sensor having a fixed line-of-sight relative to said missile, said sensor providing a first signal comprising frames of image data and said method including the steps of:
  identifying a target in said frames of image data and providing a second signal representative of the location of the centroid of an image of said target, further including the steps of providing a difference between said first and second frames of image data and ascertaining an image growth center of said target in response to said difference between said first and second frames of image data;
  tracking said target and providing a third signal representative of an aim point of said missile; and
  controlling the velocity vector of said missile in response to said second and third signals, including the steps of:
    comparing the image growth center to the aim point and providing an error signal in response to said comparison and
    controlling the velocity vector of said missile to maintain said error signal within a predetermined value.

* * * * *